United States Patent Office 3,687,855
Patented Aug. 29, 1972

3,687,855
SOLID IODOPHOR CLEANSING COMPOSITIONS
Alfred Halpern, Great Neck, N.Y., assignor to
Synergistics, Inc., New York, N.Y.
No Drawing. Filed May 5, 1969, Ser. No. 822,002
Int. Cl. C11d 3/48
U.S. Cl. 252—106    31 Claims

ABSTRACT OF THE DISCLOSURE

Solid iodine-containing germicidal cleansing compositions containing an iodophor, an extender substance polyoxyethylene glycol, a fatty alcohol of the formula ROH, wherein R is a saturated alkyl group of from 10 to 18 carbons in chain length and a detergent selected from the group consisting of the alkyl sulfo esters of the formula R—COO—$CH_2$—$CH_2$—$SO_3$—Na, sodium N-cyclohexyl - N - palmitoyltaurate, sodium N-alkyl acyl-N-methyltaurate said alkyl group being from 10–18 carbon atoms in chain length, and mixtures of these, which are manufactured into proper size and shape by either a hot-pour molding process, a cold stamping, or an extrusion process, and are stable, non-hygroscopic, to retain their germicidal properties for prolonged periods of time, for use to degerm biologic tissues as well as inanimate objects.

---

This invention relates to solid iodine-containing germicidal cleansing compositions, methods for their manufacture and methods for degerming skin and inanimate objects. In particular it relates to germicidal cleansing compositions containing iodophors, which are intended to reduce the microbial contamination of biologic tissues and inanimate objects and the methods for their preparation as solid unit dosage forms as well as the methods to their use in degerming a surface.

Germicidal cleansing compositions do not include iodine as the anti-microbial compound because of the inherent limitations of elemental iodine. It is well known that elemental iodine is a strong corrosive and oxidizing agent which has a high vapor pressure causing it to volatilize. Such high chemical reactivity of elemental iodine, furthermore, introduces complex chemical reactions which tend to destroy the stability of the unit dosage form containing iodine as the active germicidal compound. Another limitation of elemental iodine as a biologic antiseptic is its well known toxicity, tissue irritation and tendency to stain tissue and natural fibers.

Notwithstanding, these inherent noxious characteristics, elemental iodine has long been established to be one of the most effective and desirable anti-microbial agents, enjoying wide-spread use in clinical medicine as well as in first aid preparations. However, it should be recognized that the use of elemental iodine in pharmaceutical preparations is virtually limited to a single dosage form and that is the well known aqueous-alcoholic solutions, such as tincture of iodine and Lugol's solution. It is for these pharmaceutical products that the inherent limitations of elemental iodine are most apparent.

Recent years have witnessed marked advances in the control of the biologic limitations of elemental iodine through the use of iodophors and in particular polyvinylpyrrolidone-iodine, which is a water soluble, physiologically acceptable polymeric compound containing iodine in complexed form. While polyvinylpyrrolidone-iodine is generally non-irritating to biologic tissue and the overall toxicity of the iodine present in this compound has been greatly reduced, the fundamental chemical reactivity of iodine has not changed and the well known difficulties of the manufacture of solid cleansing bars containing elemental iodine are all present when an iodophor is used in place of elemental iodine.

Solid bar germicidal cleansing preparations are composed of an active germicidal agent and a pharmaceutically compatible carrier which may be either a soap or a synthetic detergent. Such solid bar preparations further contain various additives to improve the utility and stability of the product in the presence of moisture. When iodine is added to the bar vehicle to be utilized as the anti-microbial agent, we find that new problems arise which tend to further interfere with the stability and use of such solid detergent bars or to so materially reduce their germicidal action that these preparations are generally not effective antiseptic products. In part, these difficulties are due to a basic incompatibility between iodine and the components of the soap bar or the synthetic detergent bar. Thus, when a soap is used as a carrier, we find that the metallic component of the soap inter-acts with the iodine to form an inorganic metallic iodide salt and at the same time, a degraded fatty acid results. Since soaps are generally prepared from natural fats through saponification with alkali, we find that iodine will add to the unsaturated fatty acid components, which are always present in natural fats, to inactivate the germicidal properties of the iodine and this also interferes with the detergency of the finished preparation. Moreover, iodine has such a high vapor pressure that will cause it to volatilize from a solid bar cleansing preparation thus further reducing the iodine concentration and limiting the potential germicidal activity of the product.

The germicidal activity of an iodine preparation is dependent upon the availability of elemental iodine to the substance being treated. It is the amount of available iodine, in atomic form, which is capable of exerting an antiseptic effect but not that iodine content in the form of iodides or organically bound iodine. Thus, the iodophors which have been found to be agents avoiding certain of the limitations of elemental iodine by increasing their stability and aqueous solubility while retaining the antiseptic properties, are dependent upon the amount of available atomic iodine in the particular iodophor compound used for their antiseptic activity. The available atomic iodine, moreover, behaves in an identical manner as elemental iodine, which, in fact it is, both chemically and physically. Thus, we find that in the preparation of solid bar germicidal cleansing preparations, the use of iodine as an antimicrobial agent has been avoided because of the inherent chemical and physical incompatibilities, together with noxious physiologic effects resulting after the use of this compound.

It was found that satisfactory and effective germicidal solid detergent bars containing an iodophor compound may be prepared when a primary alkanol of the formula ROH, wherein R is a saturated alkyl group of from 10 to 18 carbons in chain length, is added to a compatible extended substance and a suitable detergent. Satisfactory detergent germicidal bars may be prepared by adding from 0.5 to 25 percent by weight of a member of an aforesaid group of alcohols to a composition containing an iodophor compound selected from the group consisting of polyvinylpyrrolidone-iodine, nonylphenoxypoly-(ethyleneoxy)-ethanol iodine and undecoyliumchloride iodine, together with a pharmaceutically acceptable inert extender compound selected from the group consisting of the solid polyoxyethylene glycol having a molecular weight of from 1000 to 6000 and mixtures of these, and solid mixtures prepared from the liquid polyoxyethylene glycols having a molecular weight of from 200 to 800 and polyoxyethylene glycols with a molecular weight of from 1000 to 6000 and then combining this mixture with a detergent from the group consisting of the alkylsulfoester of the formula R—COO—$CH_2$—$CH_2$—$SO_2$—Na, sodium N-cyclohexyl-N-palmitoyltaurate, sodium N-alkyl acyl-N-methyltaurate said alkyl group being from 10 to 18 carbon atoms in chain length and sodium N-methyl-N-palmitoyltaurate, and sodium lauryl sulfate.

The solid germicidal cleansing bar thus obtained exhibits none of the limitations known to exist for the older preparations and the resultant solid bar is neither hygroscopic nor too rapidly dissolving and retain its germicidal activity for prolonged periods of time. Unexpectedly it was found that binding agents, which are described as being essential to the preparation of satisfactory solid iodine-containing cleansing bars were not required in the presence of a higher alkyl fatty alcohol. The unexpected and novel action of the higher fatty alkyl primary alcohol in stabilizing the detergent bar composition to avoid the well-known limitations when iodophor compounds are used as germicides in such preparations, is to provide a hardening and insulating stabilizing action between the detergent and the iodophor through the formation of a new polar equilibrium. Thus, in effect, a molecular film is formed from the fatty alkyl alcohol interpersed between the iodophor and the detergent molecules to provide a stable matrix which contributes to the rigidity and stability of the detergent bar as well as to counter-act certain of the inherent limitations of the iodine germicidal agent.

The new solid detergent iodine-containing germicidal bars are prepared with well known detergent compounds, as for example, the saturated fatty acid esters of sodium isethionate, sodium N - cyclohexyl-N-palmitoyltaurate, sodium N-alkyl acyl-N-methyltaurate said alkyl group being from 10 to 18 carbon atoms in chain length, sodium N-methyl-N-palmitoyltaurate and mixtures of these. The fatty acid moiety of the aforesaid detergents should be saturated and have a carbon chain length of between 10 to 18 carbons. These detergents exhibit an increase in detergency with the increase in the size of the fatty acid chain and possess high wetting, foaming and lathering properties in both hard and soft water. Moreover, they are chemically stable over a wide pH range and retain their surface-active properties in the presence of oxidizing or reducing agents. When preparing the new solid iodine-containing detergent bars, the preferred range in concentration of the detergent component is from 10 to 25 percent by weight based upon the weight of the individual bar formed, although greater or lesser amounts may be used under certain circumstances.

The germicidal properties of the new solid detergent bars are contributed by an iodophor which is a compound comprising elemental iodine and a carrier therefor. The iodophor is characterized by the formation of an iodine complex with the organic carrier to alter the physical and biologic properties of the elemental iodine while maintaining its antiseptic germicidal spectrum. Thus, a wide range of organic compounds have been shown to possess the necessary properties to form an iodophor with iodine and there iodophors are suitable to the preparation of the new solid detergent cleansing bars. Such compounds as polyvinylpyrrolidone-iodine (described in U.S. Pat. No. 2,739,922, issued Mar. 27, 1956) nonylphenoxypoly-(ethyleneoxy)-ethanol-iodine (described in U.S. Pat. No. 2,931,777, issued Apr. 5, 1960) and undecoyliumchloride-iodine (described in Merck Index, Eighth Edition, Merck and Co., Rahway, N.J. (1968) p. 1092) are examples of different types of iodophors which may be used to prepare the new solid detergent germicidal bars, although polyvinylpyrrolidone-iodine is a preferred iodophor compound for this purpose.

When polyvinylpyrrolidone-iodine is used, the iodophor complex containing from 1 to 20 parts of active iodine per 100 parts of dry powder is preferred. This compound is stable under the ordinary conditions of storage and is capable of forming aqueous solutions containing more than 10 percent by weight of iodine. Chemically it has been shown that the polymer, polyvinylpyrrolidone assumes a helical shape with the iodine molecules stored inside the helix. This structure indicates that the polyvinylpyrrolidone combines with one mole of iodine per mole of monomer and also that it involves an ionic bond. When the alkyl-aryl-polymer-ether-alcohol-ester-iodine complex iodophor compounds are used, as for example, nonylphenoxypoly-(ethyleneoxy)-ethanol-iodine complex, or when undecoyliumchloride-iodine complex is used, then these are present at a concentration of from 3 to 20 percent by weight of the compound based upon the weight of the individual bar.

An extender substance is used to facilitate the homogenous distribution of the active germicidal compound and the detergent agent, as well as to provide substantive body to the solid bar. The extender substance, moreover, must not interfere with the specific properties of either the germicidal agent or the detergent. It is especially important that this agent be suitable to a molding, stamping or extruding process of manufacture and that it be water soluble, non-hygroscopic as well as to possess a suitable degree of hardness to lend substantative body to the detergent bar. Such extender compounds which are suitable to provide the necessary body to the detergent iodophor bar formulation are members of the class of polymeric compounds consisting of the group of polyoxyethylene glycols which range in molecular weight from 1500 to 1600. Polyoxyethylene glycol-4000 is a perferred extender compound when a single extender substance is utilized and polyoxyethylene glycol-1500, 20 percent, and polyoxyethylene glycol-6000, 80 percent, is an example of a preferred mixture of extender compounds. The quantity of extender substance to be used per unit bar will range from 30 to 87 percent by weight, based upon the weight of the unit bar, the particular detergent selected and iodophor compound used.

The higher primary alkanols of the formula ROH, wherein R is a saturated alkyl group of from 10 to 18 carbons in chain length are used in a concentration of from 0.5 to 25 percent by weight to contribute a stabilizing and hardening action to the detergent bar formulation. This stabilizing and hardening action is achieved by dispersing the fatty alcohol between the iodophor and the detergent. The amount of the fatty alcohol to be used is derived from the iodine content of the finished bar to be manufactured and the carbon chain length of the alcohol. When the fatty alcohols of from 10 through 15 carbons in chain length are used, these require higher concentrations than the fatty alcohols having a carbon chain length of from 16 to 18 carbons. Furthermore, when the available iodine content of the iodophor compound in the unit solid bar is greater than 1.0 percent, then the concentration of the fatty alcohol to be added to the bar should be at a higher level than that utilized for the detergent bars containing less than 1.0 percent of available iodine. Generally, it will be found that for most purposes wherein the fatty alcohols of from 16 to 18 carbons in chain length are used, concentrations of between 0.5 to 10 percent of the weight of the individual bar will be satisfactory and for the lower members of this series, greater concentration up to 20 percent by weight may be required to achieve the same stabilizing and hardening properties. A preferred fatty alkanol for the purpose of stabilizing and hardening the solid bar is cetyl alcohol, although myristyl decyl, lauryl, dodecyl, palmityl and stearyl alcohols are equally satisfactory. Mixtures of n-decanol, cetyl alcohol and stearyl alcohol and mixtures of cetyl, lauryl and stearyl alcohol may also be used.

It was found that the addition of the small quantities of a fatty alcohol of from 10 to 18 carbons in chain length to the polyoxyethylene glycol extender substance caused an unexpected stabilizing and hardening action. This hardening action is not dependent on the melting point of the mass since the melting point of the mass is essentially unchanged by the addition of the fatty alcohol. It may be postulated that this effect arises from the new and special geometric orientation of the fatty alcohol in linear arrangement throughout the surface of he extender substance. A matrix is thus formed which not only provides a firmness to the solid bar but also acts to protect the iodophor compound and the detergent from intervening degradative chemical reactions. The linear geometric orientation of the fatty alcohols on the poly glycol substrate may be compared with the oriented wedge formation postulated in the theory of emulsification. The hydrophilic hydroxyl group of the fatty alcohol is preferentially attracted to the hydrophilic centers of the polyoxyethylene glycol, while the lipophilic, fatty alkyl portion of the alcohol is repelled. This, in effect, creates a series of linear extending alkyl chains anchored to the hydrophilic centers of the polyoxyethylene glycol. The lipophilic alkyl chain extending linearly from the surface of the polyoxyethylene glycol then serves to provide a matrix to confer a desirable hardness to the bar. Moreover, the degree of hardness thus achieved will vary directly with the number and distribution of the lipophilic alkyl chains.

The iodophor compound was found to form a colloidal dispersion within the extender compound, polyoxyethylene glycol. This colloidal dispersion further serves to block available hydrophilic centers in the polyoxyethylene glycol extender substance and therefore enhances the solidity of the formed detergent bar since it directs the geometric orientation of the detergent molecule into a new arrangement on its surface. The detergent compound which is also composed of a hydrophilic and lipophilic moiety under ordinary circumstances would arrange in a similar linear geometric pattern to that of the fatty alcohol. However, because the available hydrophilic centers of the extender substance have been depressed, the detergent is now oriented so that its hydrophilic portion is directed away from the extender compound. Thus, when the detergent is added to the extender compound, a uniform molecular distribution results which is in opposite polar arrangement to that formed by the fatty alcohols. In this manner a new equilibrium is formed which provides for a greatly reduced hydrophilic character. This system of reduced availability of hydrophilic centers was also unexpectedly found to materially affect the hygroscopic properties of the new solid detergent bar. Whereas the strong polar character of all of the separate components in the bar are known to have hygroscopic properties, it was unexpectedly found that when present new equilibrium formed wherein these polar centers have been internally blocked, a stabilizing action results and a non-hygroscopic, solid detergent composition which does not absorb moisture from the air even under adverse humidity conditions is obtained.

In effect, when all of the components of the new solid detergent iodine-containing cleansing bar are combined, the hydrophilic centers of the polyoxyethylene glycol substrate have been preferentially blocked by a linear arrangement of the fatty alcohol and secondarily by the colloidal dispersion of the iodophor to result in a strong lipophilic density. This facilitates the geometric orientation of the detergent molecule so that its hydrophilic center is directed away from the blocked extender substrate. The proof for the new arrangement of molecules in the new compositions was obtained through a study comparing the electrical conductivity of both the individual components and the new compositions. The measurement of the electrical conductance of a solution reflects the ability of a specific solution or dispersion to conduct an electric current, and in this manner an expression of the overall polarity of the solution is obtained. The stronger polar solutions are capable of conducting an electric current to a greater extent than are the weak or non-polar solutions. When the specific conductivity of a solution is determined by means of a Wheatstone Bridge, the specific conductance may be computed from the determined electric resistance divided into the cell constant and the specific conductance is then expressed as mhos/cm. The following formula is used to determine specific conductance:

$$L = \frac{K}{R} = \text{mhos/cm.}$$

wherein L is the specific conductance expressed as mhos/cm., K is the cell constant and R, the measure of resistance. The electrical conductance of the individual components is separately determined as is the combination of these agents in the concentration present in the formulation. If the specific conductance for the combination of substances is less than the addition sum of the separate values determined for the individual agents, then the hydrophilic or polar character of the respective individual compounds has been depressed. This establishes that a blocking effect has taken place. However, if the determined value of the combination of ingredients is greater than the sum of the individual components, then hydrogen bonding has taken place through a stimulation of the hydrophilic centers to result in a greater ionic mobility which is reflected in the increased conductivity. This study is important since it permits definition of the pattern of orientation of the separate molecules at the hydrophilic centers to result in a neutralization or suppression of the polar nature of the new composition when compared to the values obtained for the separate individual components. The electrical conductivity determined for the new detergent iodophor-containing composition indicates that there has been an alteration in the hydrophilc centers of the ingredients utilized. Thus, the polarity, or the specific electrical conductivity of the individual components of the new composition have been modified in a manner as to show a decreased specific conductivity for the new composition which is smaller than the additive sum of the individual electrical conductivity values determined for the respective substances.

When water is brought into contact with this new system, its strong polar character reverses the equilibrium formed. The hydrophilic centers of the detergent now dissolve through the surface of the water carrying with it a film of the solid bar. The tremendous increases of hydrophilic centers now afforded by the water molecules rearranges the distribution of the surface active molecules of the detergent bar film so that a new molecular positioning takes place. The hydrophilic centers of all of the components of the detergent bar are attracted to the water solvent, while the lipophilic portions extend away from the water surface. This aqueous-detergent system now behaves in the well known manner of older detergent cleansing compositions. The iodophor however, being preferentially soluble in water forms a solution making available the iodine for degerming purposes and because of the lowered interfacial tension of the system is brought into intimate contact with the surface being treated. The available iodine now exerts its full germicidal activity and the iodine germicidal effect was found to proceed at an improved and superior level to provide rapid and effective degerming action without the normally inhibiting factor of a surface grease film.

In practice the above described range in concentration for the components to be used in the manufacture of the new solid detergent germicidal bars will be found to result in new compositions which exhibit satisfactory lathering and sudsing capacity and which are durable, of proper consistency, and non-hygroscopic, while retaining its germicidal properties for long periods of time. The specific quantities of the respective active substances to be used in formulating a particular bar will vary within the described ranges in order to meet the needs of the particulate manufacturing processes used as well as the intended utility of the bar. Thus detergent cleansing bars to be used to degerm a natural fiber or thread will require a different degree of hardness than that used to degerm a solid surface. Furthermore, a detergent bar which is intended for multiple intermittent daily usage will require a different degree of detergency than will a bar intended for a single cleansing use. The solid bar to be used for the purpose of rendering a skin surface germ-free in the preparation of a body area for surgery, will require a higher concentration of the germicidal iodophor than will a detergent bar to be used for general routine body cleansing. In a similar manner, the bar to be used in warm humid climates requires special concern as to its hardness, which is not a critical factor for a preparation to be used in the cold dry regions. Furthermore, the particular shaping step of the manufacturing method used to form the finished detergent bar, will also influence the amount of individual component to be used within the ranges described above. Thus, when a hot-pour fusion method is preferred to shape the finished detergent bar, then it would be desired that particular ranges of fusion temperature be obtained in order to facilitate the molding process. When a cold compression or an extrusion technique is used to form the detergent bar into proper size and shape, then a broader range in the amounts of materials would be required since higher fusion point for the mass to be compressed is desired.

A preferred composition for a solid detergent-iodophor cleansing bar, having the above described desirable properties, is as follows:

| | Parts |
|---|---|
| Polyvinylpyrrolidone iodine | 5 to 20 |
| Coconut fatty acid ester of sodium-isethionate | 15 to 25 |
| Cetyl alcohol | 0.5 to 3 |
| Polyoxyethylene glycol-4000 | 65 to 75 |

To the above formulation may be added suitable coloring and aromatic materials, if desired.

It may also be found desirable to include an abrasive substance such as pumice, talc, sand, magnesium silicate, aluminum silicate and other gritty particles to the detergent bar composition in order to enhance the cleansing action by the removal of surface debris. Such abrasive ingredients are added in a concentration of from 5 to 30 percent by weight, based upon the weight of the unit bar, and preferably incorporated prior to the molding step. The degree of abrasive action may be modified according to the nature of the substance and particle size of the abrasive compound selected, as well as the concentration utilized.

Having selected the proper range of concentration for the respective substance to be included in the new solid detergent germicidal bars, these may be manufactured by either a hot-pour molding process, a cold stamping or an extrusion process. When the hot-pour molding process is used, the indicated quantity of polyoxyethylene glycol is warmed to the liquid state and to this is added the selected fatty alcohol. The mixture is stirred until complete solution is achieved. The temperature is maintained just below the solidification point of the melt and the iodophor substance is stirred into the melt. The mixture is stirred until complete dispersion is achieved and then the detergent is added with stirring. The liquid is poured into molds of suitable size and shape and allowed to harden at room temperature before they are removed for wrapping and packaging.

When cold stamping or extrusion processes are used, then the mixture of the appropriate quantity of the polyoxyethylene glycol and the fatty alcohol are melted and then allowed to solidify. The solid mass is then fragmented and milled with the iodophor to achieve a homogeneous distribution. It may be desired to introduce the iodophor as dispersion in a portion of the propylene glycol and this may be accomplished by separately mixing one-half the quantity of the extender substance selected for the formulation with the iodophor compound, preferably just at the liquification point. This is then added to the solid mass previously prepared from the mixture of the fatty alcohol and the remainder of the propylene glycol. After a uniform and homogeneous distribution of the iodophor in the mass has been achieved, the detergent substance is added and the entire mixture milled to obtain a uniform mixture of suitable particle size. The mixture is then compressed or extruded into bars of suitable size and shape, which are then wrapped and packaged for use.

The new solid detergent germicidal cleansing bars are light tan in color with a smooth lustrous texture. The bars are of such durability and firmness as to make them eminently suitable for use in the routine cleansing and degerming of both biologic tissues and inanimate objects. The dissolution rate for a representative core, 15 mm. in diameter and 16 mm. long, obtained from the new solid bar prepared from the above described formulations, when placed in a suitable cylinder and exposed to running water at 50° C., was established to be not less than 45 minutes. The cleansing properties of the solid bar were found to be highly desirable and 1 percent aqueous dispersion of a sample of a solid bar prepared according to the above formulations, has a surface tension of not less than 25 dynes/cm.$^2$ and not more than 38 dynes/cm.$^2$. The interfacial tension of a 1 percent dispersion of a representative solid detergent bar formulation described above, when tested against a mineral oil interface is not greater than 2 dynes/cm.$^2$. When 50 cc. of 5 percent w./v. aqueous dispersion of the new solid bar iodophor-containing composition is shaken in a graduated, stoppered cylinder, an initial foamhead of 45 cc. is formed which, after one hour, exhibits a residual height of 35 cc. The type of foam produced initially is a small dense foam and at the end of one hour, there is only a moderate increase in the foam size. This desirable lathering characteristic makes the new composition particularly desirable for use as a shaving preparation.

The pH of a 5 percent dispersion of the new compositions has a pH range of not less than pH 4.5 and not more than pH 7. This slightly acid pH range is highly desirable in maintaining the acid-mantle of the skin. It is well known that both the microbial invasion and seborrheal pathology are accompanied by a shift in the surface pH of the skin from the mild acid range to the more alkaline pH. An important characteristic of agents used to treat such entities is their ability to maintain the acid pH of the skin and it is because of their alkalinity that virtually all natural soap products and alkaline synthetic detergent cleansing bars are not recommended for use in the presence of these conditions. The unexpected finding of the highly desirable acid mantle characteristic of the pH of the new composition, despite the presence of an anionic detergent, makes these new compositions most satisfactory for use in cleansing and degerming the skin in the presence of these pathologic states.

The stability of the new compositions is determined by comparing the amount of iodophor-iodine present in the compositions, the increase in the weight of an exposed bar which denotes hygroscopic activity, the retention of the lathering and the detergency properties as well as the overall physical appearance of the bars, after storage. These determinations were made as specific predetermined intervals under prescribed storage conditions during a suitable period of time to permit a statistical analysis of the data for significance. The new solid iodophor-containing detergent compositions were found to retain their original characteristics and statistical analysis of the determined values over a six month period of storage established that the new compositions are stable.

An important attribute of the new cleansing compositions is their germicidal activity. Thus, it was found that the new compositions possessed a microbicidal action against *Salmonella typhosa*, ATCC–6539, *Staphylococcus aureus*, FDA 209, *Escherichia coli*, ATCC–11698, and *Pseudomonas aeruginosa*, ATCC–10145, after 30 seconds of contact time. This microbiologic testing indicates that the full germicidal activity of the iodophor is not modified by its combination into the present new composition and, moreover, that the new composition has a favorable and highly desirable spectrum of germicidal activity.

When the new compositions are exposed to the open atmosphere for a period of six months, there is an increase in weight of approximately 6 percent. This minimal increase in weight due to absorbed moisture contrasts sharply with the approximately 70 percent increase in weight after similar exposure of the separate ingredients during the same period of time. When the new composition was exposed to a humid atmosphere of about 60 percent relative humidity for a period of 10 minutes, three times daily, during a period of one week, it absorbed 56 percent by weight of moisture in contrast to the 350 percent absorbed by the separate components treated in the same way.

After the storage of the individual bars in both open and closed containers at room temperature for periods of six months, there was no significant difference in the lathering properties, as determined by the foam-head tests for an aged sample when compared with a freshly prepared sample. Neither was there any modification in the physical appearance of the new composition after storage for a period of six months when compared with the freshly prepared unit bar.

The results of these tests clearly establish the unique stability and pharmaceutical utility of the new solid iodophor-containing detergent compositions. Furthermore, these compositions are prepared without the special binders required in the prior art. Thus, for the first time is achieved a solid iodophor-containing detergent bar utilizing a synthetic detergent substance which did not require special binders to convey durability and stability. Moreover, through the special processes described herein, the inherent drawback of hygroscopicity, which has limited the manufacture and utility of such compositions, has now been overcome.

The safety and lack of tissue toxicity of the new compositions was determined in both animals and humans. When the new compositions were tested for irritation potential to the delicate tissue of the rabbit's eye by the procedure described in the regulations of the Federal Hazardous Substances Labeling Act of 1960, th new compositions were found to be essentially non-irritating possessing the same level of non-irritation as was present in the control, well known and widely utilized, commercially available toilette soap. When tested for primary dermal irritation utilizing a modification of the method described in Section 191.1 of the Regulations in the Federal Hazardous Substances Labeling Act of 1960, in which 5 percent solution in the new composition was applied to both intact and abraded skin of rabbits, and there was no evidence of tissue irritation.

The new compositions were also studied for their effects on human skin utilizing a commercially available cosmetic toilette soap as a comparative control. A 10 percent (w./v.) solution of the new preparation was used to saturate a suitable gauze patch which was fixed to a plastic, occlusive backing. Similar gauze patches were prepared with a 10 percent (w./v.) solution of the commercially available soap control. Each of the respectively treated gauze patches was then applied to the skin of the inside forearm of ten male subjects, ranging in age from 22 to 26 years. After 24 hours of contact time, the patches were removed and the skin areas examined. The tissue response to the new composition was identical to that resulting from the control soap preparation and it was concluded by the investigator that the new composition was not irritating to human skin. Thus, on the basis of the animal and human irritation studies the new compositions were established to be safe for use on biologic tissue and do not result in a noxious tissue irritation. Moreover, even when applied under an occlusive dressing, there was no evidence of the known corrosive action of iodine. It is well known that the application of elemental iodine to the skin may not be covered because of the corrosive activity of elemental iodine. The present testing under occlusive dressing established that the inherent desirable properties of the particular iodophor used has not been disrupted by the present solid bar detergent composition.

In another study to determine the staining capacity of the new iodophor-containing solid bar cleansing composition, strips of cotton, linen, wool, silk and animal hair products were dipped into a 10 percent aqueous solution of the new composition and allowed to dry. After drying, the respective samples were then kept at room temperature overnight, washed with warm water and dried. In all instances there were no residual iodine stains after the final washing and drying. In still another test, starched linen and starched cotton strips were first treated with a 5 percent aqueous dispersion of the new composition, dried, stored overnight and washed with warm water. There was no iodine stain discernible on the respective cloth samples after final washing.

The following examples illustrate the present invention, but it is not intended that these be a limitation thereon.

EXAMPLE 1

In a suitable container are placed 69 grams of polyoxyethylene glycol-4000 and ½ gram of cetyl alcohol. The mixture is warmed until a uniform melt is obtained and care taken that the heating does not exceed 60° C. The temperature is now allowed to drop to between 50° and 55° C., and 7.5 grams of polyvinylpyrrolidone-iodine is added with stirring to obtain a uniform distribution, and then 17.5 grams of the coconut fatty acid ester of sodium isethionate is stirred into the mass. The mixture is then cooled to room temperature, whereupon it hardens. The solid mass is then fragmented into small particles, which are then converted into a suitable bar by being forced through a mold. The bar, which substantially weighs 100 grams, may now be wrapped and packaged for use as a germicidal detergent bar.

The new solid detergent germicidal bars are light tan in color, with a smooth lustrous texture. The dissolution rate determined for a representative core, 15 mm. in diameter and 16 mm, in length, establishes that it does not dissolved within 45 minutes when exposed to running water having a temperature of 50° C. The surface tension for 1 percent aqueous dispersion of the new bar, determined with a de-Nouy Tensiometer was 28 dynes/cm.$^2$ at 20° C., and the pH of a 5 percent aqueous dispersion of the new composition was pH 5.5. When tested for stability of the foam-head produced by shaking 50 cc. of a 5 percent (w./v.) aqueous dispersion of the new composition established that the initial foam-head of 45 cc. decreased to 35 cc. after one hour. When tested for irritation to biologic tissue to the skin of both animals and humans, utilizing the methods described in the Federal Hazardous Substances Labeling Act of 1960, the new germicidal detergent bar was found to be essentially non-irritating.

Should it be desired to include an abrasive substance to enhance the cleansing action of the new solid detergent germicidal cleansing bar, then from 5 to 30 percent of powdered pumice may be added just prior to the molding step. The pumice should be uniformly distributed through the composition. The degree of abrasive action obtained will depend not only on the particle size of the pumice, but also on the quantity utilized. Thus, the lower limits between 5 to 10 percent will provide a milder abrasiveness than will the upper limits of 20 to 30 percent. While the particle size is important and is generally graded as coarse, medium, or fine, it is the amount of the abrasive substance present which also influences the abrasiveness produced.

EXAMPLE 2

In a suitable vessel are placed 25 grams of polyoxyethylene glycol-4000 and 20 grams of polyoxyethylene glycol-6000 and liquified. To this is then added 3 grams of myristyl alcohol. The mixture is then allowed to cool to the point where it just becomes a plastic mass. In a separate vessel are placed 20 grams of polyoxyethylene glycol- 1540 which is gently warmed until liquified and 15 grams of polyvinylpyrrolidone are added while stirring to achieve a uniform dispersion. The mixture is then added to the previously prepared plastic mixture of polyethylene glycols and myristyl alcohol. After thorough stirring to achieve a uniform distribution, 20 grams of sodium-N-cyclohexyl-N-palmitoyltaurate is added to the plastic mass with continued stirring and the whole allowed to cool to room temperature. The solid mass is then fragmented into smaller particles and compressed into a solid bar of suitable size and shape.

The new solid detergent bar has a firm consistency and is light tan in color. When a representative sample is exposed to running water at a temperature of 50° C., it does not completely dissolve within 45 minutes. The pH of a 1 percent aqueous dispersion of the new composition is pH 5.3 and the surface tension of a 1 percent aqueous dispersion is 31 dynes/cm.$^2$ at 20° C. The foam-head produced by shaking 50 cc. of a 5 percent (w./v.) aqueous dispersion of the formed new compositions is 51 cc., which decreases to 38 cc. within one hour. The new composition is essentially non-irritating to human skin and exhibits a broad spectum of germicidal activity.

EXAMPLE 3

In a suitable container is placed 30 grams of polyoxyethylene glycol-2000; 20 grams of polyoxyethylene glycol-6000; 20 grams of polyoxyethylene glycol-1540 and the whole melted. To the molten material is added 10 grams of lauryl alcohol and the mixture allowed to cool to room temperature. The solid mass is then placed in a ball mill and 10 grams of nonylphenoxypoly-(ethyleneoxy)-ethanol iodine is added. The mixture is milled for approximately one-half an hour and then 10 grams of sodium-N-coconut fatty acid amide of methyl taurate is added and the milling continued. When the homogeneous distribution has been achieved, the solid material is collected and compressed into a solid bar of suitable size and shape.

The new solid composition is a tan lustrous solid having a surface tension of 31 dynes/cm.$^2$ for a 1 percent aqueous dispersion. The pH of 5 percent aqueous dispersion is pH 5.4. A representative sample of the formed bar does not completely dissolve when exposed to running water 50° C. for 45 minutes. It is non-irritating to the skin of animals and humans and exhibits a broad germicidal spectrum.

EXAMPLE 4

To a base prepared from 10 grams of polyoxyethylene glycol-200; 5 grams of polyoxyethylene glycol-400 and 10 grams of stearyl alcohol is added 9 grams of undecoyliumchloride-iodine. The mixture is stirred to achieve a uniform colloidal dispersion. In a separate vessel is placed 40 grams of polyoxyethylene glycol-4000, and 20 grams polyoxyethylene glycol-6000. The mixture is melted and to the melt is added 5 grams of decyl alcohol and stirred. The colloidal dispersion of the undecoyliumchloride-iodine, polyoxyethylene glycol and the fatty alcohol is then added to the mixture of polyoxyethylene glycol and decyl alcohol and stirred until a uniform distribution is achieved. To this mixture is then added 2 grams of sodium-stearyl-ethionate. The liquid mixture is stirred, poured into molds and allowed to cool, to prepare four solid bars, each weighing about 30 grams. A 1 percent dispersion of the new composition has a pH of 4.3 and a surface tension of 28 dynes/cm.$^2$.

EXAMPLE 5

In place of the polyvinylpyrrolidone-iodine used in Example 1 and Example 2 may be substituted equal quantities of nonylphenoxypoly-(ethyleneoxy)-ethanol-iodine complex and undecoylium chloride iodine complex. It may be desired to increase the concentration of iodophor content in the solid detergent germicidal bar for special purposes and in these instances the range of iodophor concentration will vary betwen 3 and 20 percent by weight based upon the weight of the individual unit bar. This range in concentration for the iodophor will be found to result in desirable germicidal activity without local tissue irritation to humans and animals. The remainder of the steps being the same and the physical properties of the respective solid composition are as described above.

EXAMPLE 6

In place of the fatty alcohols described in Examples 1 to 4, having the formula ROH, wherein R is a saturated alkyl group of from 16 to 18 carbons in chain length, may be substituted any other member of this group in the same quantities as is described in Examples 1 to 4. In certain instances it may be desired to either increase or decrease the concentration of these higher fatty alcohols and in this event, the range in concentration for the fatty alcohol is from 0.5 to 10 percent. In place of the lower members of this group of fatty alcohols, having the formula ROH, wherein R is a saturated alkyl group of from 10 to 15 carbons in chain length, as is described in Examples 3 and 4, may be substituted any other member of this group of lower fatty alcohols in the same quantities as set forth in Examples 3 and 4.

While the even numbered carbon chain length alkyl fatty alcohols are preferred, the odd numbered members of this series are equally satisfactory. Thus, the 11, 13, 15, and 17 carbon n-alkyl primary alcohols are also desirable for use to prepare the new composition and are used in the same concentration as set forth above.

EXAMPLE 7

In place of the detergent compounds utilized in the above Examples 1 through 6 may be substituted a single detergent sodium lauryl sulfate. The preferred concentration of sodium lauryl sulfate to be used is from 10 to 20 percent by weight of the individual bar. The order of the incorporation of the sodium lauryl sulfate is the same as that set forth in the addition of the other detergent substances, the remainder of the steps being the same and the solid detergent bar thus formed compares in its properties with the solid detergent germicidal cleansing bars prepared in Examples 1 through 6.

EXAMPLE 8

When it is desired to obtain a germicidal cleansing effect, then the new detergent bars are brought into contact with the wet surface of the object intended to be degermed. A copious lather is developed and the lather and detergent film is worked into the surface by brisk rubbing. The suds are then allowed to remain intact with the surface for a period of at least 30 seconds after which time the surface is rinsed free of the detergent film. There is a substantial degerming of the surface of the object as a result of this treatment and bacteria, yeast, molds, fungi, and virus organisms are susceptible to the germicidal properties of the new compound. These organisms are all destroyed within 30 seconds to one minute of contact with a film of the new detergent containing an iodine concentration as low as 1:5000.

When it is desired to obtain a degerming cleansing action to an infected wound, then this may be accomplished by first irrigating the wound with warm water to remove adhering particulate matter. A copious lather is developed by rubbing the surface of the solid bar and this lather, together with the detergent film, is applied to the surface of the wound by means of a sterile gauze pad. The wound is gently cleansed and the detergent film and dirt removed by irrigation with warm water. The procedure is repeated utilizing another gauze pad which is then left intact over the surface of the wound for a period of at least one minute, after which time, it is removed and the wound irrigated with sterile water, patted dry with a sterile gauze pad after which subsequent therapeutic procedures may be instituted.

Should it be desired to degerm the skin of the patient, prior to a surgical procedure, then the indicated area is vigorously washed with the new detergent bar developing a copious lather by rubbing into the skin over a period of 10 minutes. Intermittent rinsing may be utilizing but the lather and the detergent germicidal film should be in contact with the skin for a total period of at least five minutes. At the conclusion of the cleansing procedure, the skin should be patted dry with a sterile towel and kept covered to avoid contamination.

When it is desired to prevent the re-occurrence of furuncles and carbuncles in patients particularly pre-disposed to this occurrence, then the germicidal detergent bar should be used in the routine daily hygiene, bathing and washing thoroughly cleansing the area wherein such manifestations are most commonly occurred. Such general body cleansing should be conducted at least twice daily in the more acute stages. The new detergent germicidal bar may be used in the cleansing of the hands of those individuals working in the food industry and public health professions, to prevent cross-contamination. A five minute scrub of the hands with the new germicidal composition developing a copious lather which is allowed to remain in contact with the skin for at least one minute each time before being rinsed, will serve as a prophylactic measure to prevent the carry over of micro-organisms from a contaminated area to a non-contaminated area. Thus, those individuals working in kitchens, restaurants, nurseries, schools, as well as dentists, nurses, physicians and for general home use, who, because of their daily activity have the opportunity to mechanically transmit infectious organism, will be less apt to cross-contaminate a secondary contact by following the above procedure of washing the hands, and other exposed parts of the body, after each exposure to contaminating organisms.

EXAMPLE 9

The new solid detergent composition may be utilized to cleanse and degerm the surface of inanimate objects as for example, leather, kitchen utensils, hospital rooms and furniture, nursery furniture, items of personal hygiene, such as combs and brushes, and then toilette articles, as well as for the broad group of objects wherein it is desirable to maintain a relatively germ-free environment. For this purpose, the detergent germicidal bar is used directly to wash the surface of the object allowing the lather and detergent film to be in contact with the organism for a period of at least 1 to 5 minutes depending on the nature of the substance being cleansed and the degree of contamination.

EXAMPLE 10

When it is desired to remove an oil film or to cleanse and degerm cloth, thread, or a fiber strand so as to prevent mildew and other microbial growth contamination, then the material to be cleansed and degermed is first moistened and then brought into contact with the solid detergent germicidal composition so that a surface film is transmitted to the material being cleansed. The surface detergent film is allowed to remain in contact for at least one minute, after which time it is rinsed with running water. An alternate method to achieve the same cleansing and degerming action is to pass the substance being cleansed through an aqueous dispersion of the new germicidal compositions and then rinsing the surface free of the detergent film and air dried. A concentration guideline of at least 1:1000 of available iodine is used as a means of calculating the desired concentration of the new composition in the dispersion of the degerming, cleansing bath, and a contact time of at least one minute is preferred. Materials so treated are substantially free of microbial contamination and generally resistant to mildew. Desirable cleansing is achieved with minimal of mechanical agitation because the interfacial tension between an oil film and the aqueous dispersion of the new compositions is less than 2 dynes/cm.$^2$, which value facilitates spontaneous emulsification. Another advantage of the above procedure is the avoidance of staining to the surface of the cloth, thread or fiber being treated.

EXAMPLE 11

When it is desired to provide a degerming action to the skin of the patient suffering from acne, then the new detergent germicidal composition should be used in the washing of the afflicted area at least four times daily. A film of the solid detergent bar is applied directly to the skin and then rubbing to develop a copious lather to remain in contact for a period of at least five minutes. The lather is then rinsed and the process may be repeated depending upon the severity of the acne. Thus, in the presence of diffuse infected seborrheal acne, the cleansing process should be repeated for each of the four daily washings. After several treatments a drying action will appear, which is highly desirable to achieve a subsidence of the acne. The degerming properties of the new compositions help control the secondary microbial invaders, thereby minimizing the development of noxious scarring resulting after infectious pustule development commonly occurring with this disease.

EXAMPLE 12

The new detergent germicidal compositions are highly desirable for use in cleansing and degerming the scalp to counteract the itching and scaling accompanying the dandruff. When it is desired to relieve these symptoms of the scalp, the hair is moistened and a copious lather is developed utilizing the direct application of the new solid germicidal detergent composition to the hair and scalp. The lathered hair and scalp are then vigorously rubbed to remove the loose scales and the formed lather is allowed to remain in contact with the hair and scalp for five minutes. The application is then removed by rinsing and the process repeated for another period of five minutes of contact with the lather of the new compositions. The hair and scalp should be shampooed in this manner at least three times in the first week and then once or twice weekly thereafter. In this manner, the scalp will be freed of the scaling and itching commonly associated with dandruff.

The above described regimen is of value to counteract excessive oiliness of the hair and scalp. Those individuals, whose hair and scalp are not subject to excessive oiliness, should reduce the frequency of the application of the new detergent germicidal cleansing composition, as is required. A particular advantage of the new compositions is their ability not to stain or discolor the hair and the scalp. This absence of discoloration occurs when dyed hair as well as natural hair is treated.

EXAMPLE 13

When it is desired to utilize the new solid detergent germicidal compositions as a body deodorant, particularly in the reagents of the axillae, then this may be accomplished by a development of a copious lather over the body with particular reference to the axillae and other hirsute areas. The lather should be allowed to remain in contact with the tissue for a period of at least one minute and then rinsed. In deodorizing particular areas of the body, as for example the feet, in the presence of bromidosis, a similar treatment regimen is utilized, care being taken to work the lather into the tissues between the toes and, with the aid of a brush, underneath the toenails. A contact time of at least one minute is desirable to degerm and deodorize body tissue.

EXAMPLE 14

It may be desired to utilize the new germicidal iodophor-containing cleansing composition in the form of a powder, and in this event, either the formed unit dosage bar compositions described above may be pulverized through any of the techniques which are generally known in the art. An alternate procedure to obtaining the powdered form of the above described solid germicidal cleansing composition is to pulverize the solid mass obtained at the conclusion of the manufacturing steps, but prior to the step of molding into individual unit bars. Thus, the compositions obtained as a result of Examples 1 through 7 above may be pulverized or sub-divided into a pharmaceutically acceptable particle size for example, a standard mesh size of from #8 to #60 standard screen mesh particle size, and packaged in unit-containers to deliver the desired quantity of solid detergent cleansing composition. Should it be desired to utilize shavings, or scrapings, rather than a powdered or pulverized composition, then this may be accomplished from the solid compositions obtained as a result of Examples 1 through 7 above in the manner known to the art.

The above described powders, shavings and scrapings of the solid germicidal cleansing composition may be used in place of the solid germicidal cleansing composition as described in Examples 8 through 13. The same results as is obtained with the solid bar compositions will be achieved with the powdered form of the new compositions. Moreover, the powdered form will permit a quantitative metering of the amount of the compostion to be used and thus provide a more critical control over the quantity of the subject compositions used at any one time when such control is desired.

The resultant powder is applied to the moistened surface and a cleansing germicidal foam developed. The foam may be permitted to remain in contact with the surface to be cleansed and degermed for at least one minute after which time it is rinsed. A particular advantage of the powdered dosage form of the solid germicidal cleansing composition is in the use for cleansing and degerming the skin of the acne patient since the powdered form is more adaptable to the contours of the face. The powdered form is especially desirable when an abrasive action is required since it provides control over the degree of abrasiveness by metering the amount of the cleansing composition. The powdered forms of the above described solid germicidal cleansing compositions also have a preferred utility in cleansing special areas of the body as for example, between the toes or in back of the ears, which, because of their topography make it difficult for the planer surface of the solid compositions to reach the recesses.

What is claimed is:

1. A pharmaceutical cleansing germicidal bar comprising,
   (a) from 30 to 87 percent of an extender compound selected from the group consisting of polyoxyethylene glycols with a molecular weight of from 1540 to 6000 and mixtures of these,
   (b) from 0.5 to 25 percent of a primary alkanol selected from the group consisting of compounds of the formula ROH, wherein R is an alkyl group of from 10 to 18 carbon atoms in chain length and mixtures of these,
   (c) from 3 to 20 percent of an iodophor selected from the group consisting of polyvinylpyrrolidone-iodine, nonylphenoxypoly-(ethyleneoxy)-ethanol iodine and undecoyliumchlorideiodine, and mixtures of these,
   (d) from 10 to 25 percent of a detergent selected from the group consisting of the alkyl acyl esters of sodium isethionate, wherein said alkyl group is from 14 to 18 carbons in chain length, sodium N-cyclohexyl-N-palmitolytaurate, sodium N-alkyl acyl-N-methyltaurate wherein said alkyl group is from 10 to 18 carbon atoms in chain length and mixtures of these and sodium lauryl sulfate.

2. The bar of claim 1, wherein said extender compound is polyoxyethylene glycol-2000.

3. The bar of claim 1, wherein said extender compound is polyoxyethylene glycol-1540.

4. The bar of claim 1, wherein said extender compound is polyoxyethylene glycol-4000.

5. The bar of claim 1, wherein said extender compound is polyoxyethylene glycol-6000.

6. The bar of claim 1, wherein said extender compound is the mixture of polyoxyethylene glycol-2000, polyoxyethylene-6000, and polyoxyethylene glycol-1540.

7. The bar of claim 1, wherein said a primary alkanol is cetyl alcohol.

8. The bar of claim 1, wherein said a primary alkanol is myristyl alcohol.

9. The bar of claim 1, wherein said a primary alkanol is stearyl alcohol.

10. The bar of claim 1, wherein said a primary alkanol is palmityl alcohol.

11. The bar of claim 1, wherein said a primary alkanol is lauryl alcohol.

12. The bar of claim 1, wherein said a primary alkanol is dodecyl alcohol.

13. The bar of claim 1, wherein said a primary alkanol is decyl alcohol.

14. The bar of claim 1, wherein said a primary alkanol is a mixture of n-decanol, cetyl alcohol and stearyl alcohol.

15. The bar of claim 1, wherein said a primary alkanol is the mixture of cetyl alcohol, lauryl alcohol and stearyl alcohol.

16. The bar of claim 1, wherein said iodophor is polyvinylpyrrolidone-iodine.

17. The bar of claim 1, wherein said iodophor is nonylphenoxypoly-(ethyleneoxy)-ethanol iodine compound.

18. The bar of claim 1, wherein said iodophor is the undecoyliumchloride-iodine compound.

19. The bar of claim 1, wherein said detergent is the coconut fatty acid ester of sodium isethionate.

20. The bar of claim 1, wherein said detergent is an alkyl acyl ester of sodium isethionate, said alkyl group being 13 carbons in chain length.

21. The bar of claim 1, wherein said detergent is an alkyl acyl ester of sodium isethionate, said alkyl group being 15 carbons in chain length.

22. The bar of claim 1, wherein said detergent is an alkyl acyl ester of sodium isethionate, said alkyl group being 17 carbons in chain length.

23. The bar of claim 1, wherein said detergent is sodium N-cyclohexyl-N-palmitoyltaurate.

24. The bar of claim 1, wherein said detergent being sodium N-alkyl acyl-N-methyltaurate wherein said alkyl group is from 10 to 18 carbon atoms in chain length.

25. The bar of claim 1, wherein said detergent is sodium N-methyl-N-palmitoyltaurate.

26. The bar of claim 1, wherein said detergent is sodium lauryl sulfate.

27. The bar of claim 1, wherein said extender compound is from 65 to 75 parts of polyoxyethylene glycol-4000, said fatty alcohol is from 0.5 to 3 parts of cetyl alcohol, said iodophor is from 5 to 20 parts of polyvinylpyrrolidone iodine and said detergent is from 15 to 25 parts of the coconut fatty acid ester of sodium isethionate.

28. The method for the preparation of the bar of claim 1 comprising the steps of:
   (a) melting from 30 to 87 percent by weight of an extender compound selected from the group consisting of polyoxyethylene glycols with the molecular weight of from 1540 to 6000 and mixtures of these,
   (b) adding to the extender compound from 0.5 to 25 percent of a primary alkanol selected from the group consisting of alkanols of the formula ROH, wherein R is an alkyl group of from 10 to 18 carbons in chain length and mixtures of these,
   (c) cooling the resulting mixtures and adding thereto from 3 to 20 percent by weight of an iodophor compound selected from the group consisting of polyvinylpyrrolidone - iodine, nonylphenoxypoly-(ethyleneoxy)-ethanol iodine, undecoyliumchloride iodine, and mixtures of these, and, (d) mixing the product obtained in step (c) and adding thereto from 10 to 25 percent of a detergent selected from the group consisting of the alkyl acyl esters of sodium isethionate, wherein said alkyl group is from 14 to 18 carbons in chain length, sodium N-cyclohexy - N - palmitoyltaurate, sodium N-alkyl acyl-N-methyltaurate wherein said alkyl group is from 10 to 18 carbon atoms in chain length and sodium lauryl sulfate, (e) mixing the product of step (d) to obtain a homogeneous distribution, (f) compressing the mixture obtained in step (e) and shaping into solid bars of suitable size.

29. The method for germicidally cleansing a surface comprising the steps of developing a copious lather on a moistened surface with the bar of claim 1, allowing said lather to remain in contact with said surface for at least 30 seconds and rinsing said surface to remove microbial debris.

30. The method for degerming the skin of a patient prior to surgery comprising the steps of:
(a) moistening the skin area to be degermed,
(b) developing the copious lather on said area by rubbing with the bar of claim 1,
(c) rubbing the lather into the skin,
(d) allowing lather to be in contact with skin for a total period for at least one minute,
(e) rinsing and drying said area.

31. The method for providing a degerming action to the skin of an acne patient which comprise the steps of:
(a) moistening the skin area to be treated
(b) developing a lather by briskly rubbing the surface of the skin with said bar of claim 1,
(c) allowing lather to remain in contact with skin area for a period of at least one minute,
(d) rinsing said lather and drying.

References Cited
UNITED STATES PATENTS

| | | | |
|---|---|---|---|
| 2,759,869 | 8/1956 | Sutton et al. | 252—107 X |
| 2,776,924 | 1/1957 | Martin | 424—150 |
| 2,972,583 | 2/1961 | Hewitt | 252—161 |
| 3,039,916 | 6/1962 | Neracher et al. | 260—513 N X |
| 3,240,711 | 3/1966 | Wittwer | 252—106 |
| 2,599,140 | 6/1952 | Taub | 252—107 |
| 2,987,484 | 6/1961 | Lundberg et al. | 252—174 |
| 3,129,187 | 4/1964 | Meehan | 252—155 |
| 2,931,777 | 4/1960 | Shelanski et al. | 252—106 |

FOREIGN PATENTS

| | | |
|---|---|---|
| 562,514 | 8/1958 | Canada. |
| 840,879 | 7/1960 | Great Britain 424—150 |
| 861,052 | 2/1961 | Great Britain. |

OTHER REFERENCES

Condensed Chem. Dictionary, Rheinhold Publishing Co., 7th ed., 1966, New York, p. 760.

LEON D. ROSDOL, Primary Examiner

P. E. WILLIS, Assistant Examiner

U.S. Cl. X.R.

252—106; 424—150

UNITED STATES PATENT OFFICE
CERTIFICATE OF CORRECTION

Patent No. 3,687,855    Dated August 29, 1972

Inventor(s) ALFRED HALPERN

It is certified that error appears in the above-identified patent and that said Letters Patent are hereby corrected as shown below:

-- Assignee: Synergistics
             Yonkers, New York   10701

Signed and sealed this 13th day of March 1973.

(SEAL)
Attest:

EDWARD M. FLETCHER, JR.          ROBERT GOTTSCHALK
Attesting Officer                Commissioner of Patents